March 8, 1938. J. P. BAXTER 2,110,785
PRODUCTION OF SOLID CHLORINATED RUBBER PRODUCTS
Filed March 5, 1934
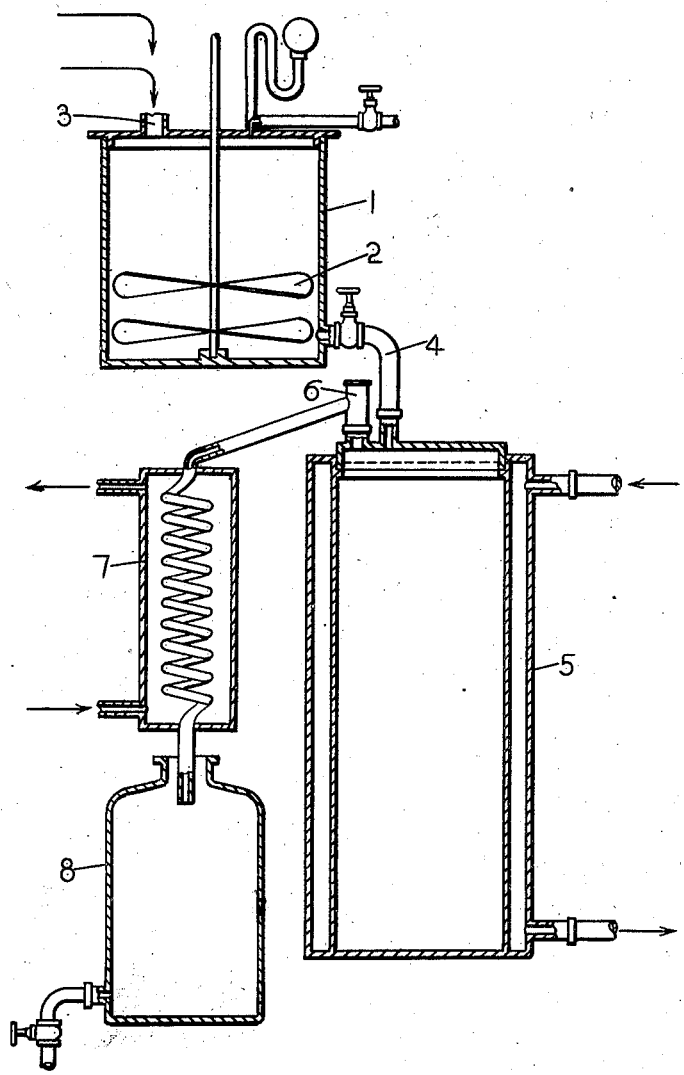
INVENTOR.
John Philip Baxter
BY
ATTORNEY.

Patented Mar. 8, 1938

2,110,785

UNITED STATES PATENT OFFICE 2,110,785

PRODUCTION OF SOLID CHLORINATED RUBBER PRODUCTS

John Philip Baxter, Widnes, England, assignor to Imperial Chemical Industries Limited, a corporation of Great Britain Application March 5, 1934, Serial No. 714,173
In Great Britain March 7, 1933

19 Claims. (Cl. 260—1)

This invention relates to the production of solid products consisting of or comprising essentially chlorinated rubber.

It is usual in the production of chlorinated rubber to pass chlorine into a solution of rubber in carbon tetrachloride, preferably until chlorine equal to about twice the weight of the rubber has been absorbed. Residual uncombined chlorine and hydrogen chloride are removed by air-blowing or treatment with basic materials, and the solution is then evaporated to produce the solid. The product obtained in this way is in the form of a white or brownish powder, the chlorine content being generally about 65 per cent.

According to the present invention, solid chlorinated rubber products are obtained in cellular form by the evaporation of the solvent from an emulsion or dispersion containing a chlorinated rubber solution. Depending on the manner in which the process is worked, the product may be obtained in the form of single cells or aggregates of a small number of cells or in the form of blocks having a cellular structure.

Preferably water is used as the dispersing medium for evaporating the solvent associated with the chlorinated rubber. In this case the solvent should consist for the most part of a liquid of lower boiling-point than water, e. g. carbon tetrachloride. Solvents of higher boiling-point than water may be used, however, if they are readily volatile in steam, care being taken that sufficient water is present to evaporate all of the solvent. An example of such a solvent is monochlorobenzene (boiling-point 132° C.).

It is also possible to have associated with the solvent, substances which are not volatile under the conditions of working and which may be used to confer desirable properties on the final powder, for example, plasticizers or softening agents may be incorporated with the chlorinated rubber in this way. Additions of suitable dyes, pigments, and/or fillers, may also be made to the emulsions or dispersions of the chlorinated rubber solution prior to the evaporation of the solvent. Plasticizers which have been found suitable include tricresylphosphate, dibutyl phthalate and chlorinated naphthalene, and as fillers fibrous materials, e. g. powdered asbestos, have been used to modify the final solid product. Solid chlorinated rubber, in comminuted form, may also be used as a filler.

In one method of carrying out the invention I inject an aqueous emulsion or dispersion of a solution of chlorinated rubber in carbon tetrachloride into a volume of water or other liquid which is a non-solvent for the chlorinated rubber, which is agitated and maintained at a sufficiently high temperature to cause rapid evaporation of the carbon tetrachloride. By this method the product obtained is in the form of single cells or small aggregates, which can be subsequently dried.

In another method of carrying out the invention in order to obtain a product in the form of a block of cellular structure, I heat an aqueous emulsion or dispersion of a solution of chlorinated rubber in carbon tetrachloride until the latter has evaporated. In order to produce a block of uniform texture, the heating must be effected as uniformly as possible and in such a manner that heat is supplied to all sides of the block at the same time. In this case plasticizers preferably should not be added to the chlorinated rubber as they appear to interfere with the production of blocks of uniform texture. This produces a cellular block more or less saturated with the aqueous medium, which, if necessary, may be drained off. The cellular product may then be dried, for example in a current of warm air. In certain cases it may be found desirable to wash the product prior to drying. The final product has a low apparent density, e. g. 0.06–0.13 gram per c. c. and is very suitable for thermal insulating purposes, especially at low temperatures, e. g. in refrigerators working with solid carbon dioxide. The material is not suitable for uses involving exposure to temperatures over 100° C.

The evaporation, in this method of working, may be advantageously carried out in a suitably shaped mould in order to obtain a shaped block adapted for a particular purpose, for example the insulation of pipe lines. It is sometimes advantageous to evaporate the solvent under reduced pressure, so as to obtain a product of finer texture and lower apparent density, e. g. 0.06 gram per c. c.

The solution of chlorinated rubber which I use may be produced directly by chlorination of rubber in carbon tetrachloride or other similar solvent, or may be made by re-solution of a previously prepared solid chlorinated rubber.

In general, a solution containing 10 per cent of chlorinated rubber is of suitable strength. It is, however, necessary to pay attention to the viscosity of the solution since with too viscous solutions it is difficult to prepare the emulsions. Too low a viscosity is also a disadvantage when making the product in the form of blocks since it renders them apt to crumble. Accordingly the viscosity should be at least 0.5 c. g. s. units and may range up to 4 c. g. s. units without undue difficulty in preparing the emulsions.

The emulsion of chlorinated rubber may be prepared by the agitation of an aqueous solution of casein, ammonia and Turkey red oil with a solution of chlorinated rubber. Alternatively, the emulsion may be used in an unstable form produced by violent agitation of water and the chlorinated rubber solution. In this case, however, it is preferable to use a dilute aqueous solution of soap rather than water alone.

A form of apparatus adapted for the production of cellular blocks is shown diagrammatically in the accompanying drawing. In the drawing, 1 represents an emulsifier provided with an agitator 2 and liquor inlet 3. If desired, an inlet for compressed air may also be provided to facilitate transference of the emulsion through the valved pipe 4 to the mould 5. For convenience in working I find that it is advisable to have the pipe 4 as short and as wide as possible.

The mould 5 is a jacketed vessel with connections for the passage of steam through the jacket and a detachable cover to enable the block to be removed. Preferably the inner wall of the mould is constructed with a glazed or enamelled surface to facilitate removal of the finished block. A paper or other form of detachable mould lining may also be used. Preferably also the mould is slightly tapered to facilitate removal of the block. At the top of the mould a connection 6 serves to conduct vapours to the condenser 7, the condensed liquids being collected in the receiver 8. Since mild steel is corroded in the presence of hot moist carbon tetrachloride, the apparatus should be made of or lined with aluminum, lead or other resistant material whenever necessary.

*Example*

Equal volumes of a 0.5% solution of soap in water and a 10% solution of chlorinated rubber in carbon tetrachloride having a viscosity of about 4 c. g. s. units are fed gradually into the vessel 1, and the mixture is thoroughly agitated until emulsified. The emulsion is then run into the mould 5, leaving about 10% of free space at the top of the mould to allow for any expansion or frothing which may take place. Steam is admitted to the jacket so as to keep the mould at about 110° C. The carbon tetrachloride which evaporates together with the water simultaneously vaporized, condenses in the condenser 7 and collects in the receiver 8 from which the solvent is afterwards run off for re-use. After removal of the cover from the mould the block is removed and drained for a short time and then dried by heating in an air oven at 70–80° C.

Dried blocks produced in this manner may be easily trimmed or cut into smaller blocks, and, if desired, may be treated with varnish or other coating material, e. g. a solution or emulsion of chlorinated rubber.

I claim:—

1. The production of solid chlorinated rubber products in cellular form by the evaporation of the solvent from an emulsion containing a chlorinated rubber solution of viscosity not exceeding 4 c. g. s. units.

2. A process for the production of solid chlorinated rubber products which comprises the step of emulsifying a solution of chlorinated rubber in a liquid medium which is immiscible with the solvent of said solution and which is a non-solvent for the chlorinated rubber, said emulsifying step being carried out at a temperature insufficient to evaporate the solvent of said solution followed by the step of heating the resulting emulsion to drive off the said solvent.

3. A process as set forth in claim 2, in which the liquid medium has a higher boiling point than the solvent.

4. A process as set forth in claim 2, in which water is used as the liquid medium for emulsifying the chlorinated rubber solution.

5. A process for the production of solid chlorinated rubber products which comprises the step of emulsifying a chlorinated rubber solution in water, the solvent of said solution being immiscible with water and of lower boiling point than water, followed by the step of heating the resulting emulsion to drive off the solvent.

6. A process for the production of solid chlorinated rubber products which comprises the step of emulsifying a chlorinated rubber solution in a liquid medium which is immiscible with the solvent of said solution and which is a non-solvent for the chlorinated rubber, followed by the step of injecting said emulsion into a volume of said liquid medium which is agitated and maintained at a sufficiently high temperature to cause rapid evaporation of the solvent.

7. A process as set forth in claim 6, in which the viscosity of the chlorinated rubber solution is 0.5–4.0 c. g. s. units.

8. A process as set forth in claim 6, in which the solvent is evaporated under reduced pressure.

9. A process as set forth in claim 6, in which the chlorinated rubber solution is associated with a substance which is non-volatile under the conditions of working, said substance being selected from the class of plasticizers, dyes, pigments and fillers.

10. A process for the production of solid chlorinated rubber products, which comprises emulsifying a chlorinated rubber solution in a liquid which is immiscible with the solvent of said solution and which is a non-solvent for the chlorinated rubber, filling a mould with the resulting emulsion, said mould being provided with heating means and means for escape of vapours, and uniformly heating the emulsion so as to drive off the solvent and to obtain a cellular block of chlorinated rubber.

11. A process as set forth in claim 10, in which the viscosity of the original chlorinated rubber solution is 0.5–4.0 c. g. s. units.

12. A process as set forth in claim 10, in which the solvent is evaporated under reduced pressure.

13. A product consisting essentially of chlorinated rubber in the form of a block having a cellular structure.

14. A product consisting essentially of chlorinated rubber and having an apparent density of 0.06–0.13 gram per c. c.

15. A product as set forth in claim 13, in which the surfaces of the block are coated with a film of chlorinated rubber.

16. A process for the production of solid chlorinated rubber products which comprises the step of emulsifying a chlorinated rubber solution in an aqueous liquid medium in the presence of an emulsifying agent, said liquid medium being immiscible with the solvent of said chlorinated rubber solution and being a non-solvent for the chlorinated rubber, followed by the step of injecting the resulting emulsion or dispersion into a volume of said liquid medium which is agitated and maintained at a sufficiently high temperature to cause rapid evaporation of the solvent.

17. A process as set forth in claim 16, in which the viscosity of the chlorinated rubber solution is 0.5–4.0 c. g. s. units.

18. A process as set forth in claim 16, in which the solvent is evaporated under reduced pressure.

19. A process as set forth in claim 16, in which the chlorinated rubber solution is associated with a substance which is non-volatile under the conditions of working, said substance being selected from the class of plasticizers, dyes, pigments and fillers.

JOHN PHILIP BAXTER.